(12) United States Patent
Kim

(10) Patent No.: US 8,330,724 B2
(45) Date of Patent: Dec. 11, 2012

(54) MULTIFUNCTION KEY PAD DISPLAY AND ELECTRONIC DEVICE HAVING THE SAME

(75) Inventor: Kyongdo Kim, Yongin-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 832 days.

(21) Appl. No.: 12/105,517

(22) Filed: Apr. 18, 2008

(65) Prior Publication Data

US 2008/0259037 A1    Oct. 23, 2008

(30) Foreign Application Priority Data

Apr. 19, 2007 (KR) .................. 10-2007-0038400

(51) Int. Cl.
*G09G 5/00* (2006.01)
(52) U.S. Cl. ........................... 345/169; 345/172
(58) Field of Classification Search .......... 345/168, 345/169, 172; 455/90, 550, 566, 575
See application file for complete search history.

(56) References Cited

U.S. PATENT DOCUMENTS

| | | | | |
|---|---|---|---|---|
| 5,059,048 A * | 10/1991 | Sirkin | ............ | 400/486 |
| 5,496,974 A | 3/1996 | Akebi et al. | | |
| 5,786,983 A * | 7/1998 | Brenner et al. | ............ | 361/679.4 |
| 6,771,247 B2 * | 8/2004 | Sato et al. | ............ | 345/98 |
| 6,933,927 B2 * | 8/2005 | Lu | ............ | 345/169 |
| 2002/0107055 A1 | 8/2002 | Yamazaki et al. | | |
| 2003/0112227 A1 | 6/2003 | Hong | | |
| 2005/0093767 A1 * | 5/2005 | Lu et al. | ............ | 345/1.1 |
| 2006/0044279 A1 | 3/2006 | Nasu et al. | | |
| 2006/0152668 A1 * | 7/2006 | Jang et al. | ............ | 349/156 |
| 2006/0251459 A1 * | 11/2006 | Griffin et al. | ............ | 400/486 |
| 2007/0029172 A1 * | 2/2007 | Choi et al. | ............ | 200/1 B |
| 2007/0093290 A1 * | 4/2007 | Winans et al. | ............ | 463/30 |

FOREIGN PATENT DOCUMENTS

| | | |
|---|---|---|
| CN | 1427330 | 7/2003 |
| CN | 1704875 | 12/2005 |
| CN | 1809865 | 7/2006 |
| EP | 0224600 A1 | 6/1987 |
| GB | 1 593 414 | 7/1981 |
| GB | 2255234 A | 10/1992 |
| JP | 61-40414 | 3/1986 |
| JP | 62-187921 | 8/1987 |
| JP | 62-151636 | 9/1987 |
| JP | 1-223525 | 9/1989 |

(Continued)

OTHER PUBLICATIONS

English-language abstract of KR 10-2001-0039294.

(Continued)

*Primary Examiner* — Amare Mengistu
*Assistant Examiner* — Stacy Khoo
(74) *Attorney, Agent, or Firm* — Lee & Morse, P.C.

(57) ABSTRACT

A multifunction key pad display for an electronic device, including: a display panel including display regions arranged in a matrix, and bounded by non-display regions as boundaries; a printed circuit board positioned on the display panel, including openings facing the display regions, and keys disposed at sides of the openings, facing the non-display regions; and a pad positioned on the printed circuit board, having transparent windows facing the openings, and pressing units facing the keys. Two rows of the keys can be arranged between two other rows of the openings.

23 Claims, 14 Drawing Sheets

FOREIGN PATENT DOCUMENTS

| | | |
|---|---|---|
| JP | 4-299407 | 10/1992 |
| JP | 4-319720 | 11/1992 |
| JP | 2002-216570 | 8/2002 |
| JP | 2006-65611 | 3/2006 |
| KR | 10-0217794 | 6/1999 |
| KR | 10-0238130 | 10/1999 |
| KR | 10-0330755 | 3/2002 |
| KR | 10-2004-0058731 | 7/2004 |
| WO | WO 2004/097785 | 11/2004 |

OTHER PUBLICATIONS

U.S. Appl. No. 12/105,628, filed Apr. 18, 2008, Kyongdo Kim et al., Samsung Mobile Display Co., Ltd.

Japanese Office Action dated Oct. 5, 2010, issued in corresponding Japanese Patent Application No. 2008-106002.

European Search Report in EP 08251468.8-2224/1983405, dated May 18, 2011 (Kim).

* cited by examiner

MULTIFUNCTION KEY PAD DISPLAY AND ELECTRONIC DEVICE HAVING THE SAME

CROSS-REFERENCE TO RELATED APPLICATIONS

This application claims priority to and the benefit of Korean Patent Application No. 2007-38400 filed Apr. 19, 2007, in the Korean Intellectual Property Office, the disclosure of which is incorporated herein by reference.

BACKGROUND OF THE INVENTION

1. Field of the Invention

The present invention relates to a multifunction key pad display, and more particularly, to a multifunction key pad display capable of easily and rapidly performing various input operations and displaying various information, and an electronic device having the same.

2. Description of the Related Art

In general, an electronic device (such as a mobile communication terminal) includes a key pad apparatus, in order to easily input various commands. In the key pad apparatus, characters, such as, images, numbers, or special signs, are assigned to the respective keys and a user operates the key pad so that various operations, such as, a telephone calling, telephone receiving, character inputting, and character transmitting are properly performed by the electronic device.

However, since the characters are fixed in the conventional key pad apparatuses, the conventional key pad apparatuses are not suitable for recent electronic devices that perform various and complicated functions. For example, since characters are previously assigned to the respective keys, it is difficult or impossible to input characters during global roaming of the mobile communication terminal. In addition, since a large number of key operations must be performed when an MP3 function, or a camera function, is used in the mobile communication terminal, it is inconvenient to use such functions. That is, since the depth of a user interface is large, it is difficult to operate the keys.

In order to solve such problems, a touch screen has been adopted as the key pad apparatus. However, little pressure is applied when the user touches the keys in the touch screen. Therefore, commands may not be properly input, or the same command can be input a plurality of times. Furthermore, when the key pad apparatus is a touch screen, power is supplied to the entire touch screen, resulting in high power consumption and high manufacturing costs.

SUMMARY OF THE INVENTION

An aspect of the present invention provides a multifunction key pad display that is capable of easily and rapidly performing various input operations, and of displaying various information items, and an electronic device having the same.

It is another aspect of the present invention to provide a multifunction key pad display that is capable of changing characters, such as, numbers, special signs, still images, and/or moving images, in accordance with the selection of a user, to display the changed characters, and an electronic device having the same.

It is still another aspect of the present invention to provide a multifunction key pad display having low power consumption and low manufacturing costs, and an electronic device having the same.

In order to achieve the foregoing and/or other object of the present invention, there is provided a multifunction key pad display, including: a display panel including display regions arranged in columns and rows, which are bounded by non-display regions; a printed circuit board positioned on the display panel, including openings arranged in columns and rows that correspond to the display regions; and keys arranged in columns and rows that correspond to the non-display regions, formed at sides of the respective openings; and a pad positioned on the printed circuit board. The pad includes transparent windows formed in regions corresponding to the respective openings, and pressing units formed in regions corresponding to the keys, at outer edges of the respective transparent windows. The keys of at least two rows are formed between two rows of the openings, and the keys of at least two rows are formed outside of the openings of two rows.

Aspects of the present invention relate to an electronic device including the multifunction key pad display, including: a display panel including display regions arranged in a plurality of columns and rows, which are bounded by non-display regions; a printed circuit board positioned on the display panel, including openings arranged in columns and rows to correspond to the display regions, and keys having columns and rows corresponding to the non-display regions, formed at sides of the respective openings; and a pad positioned on the printed circuit board. The pad includes transparent windows formed in regions corresponding to the respective openings, and pressing units formed in regions corresponding to the keys, at outer edges of the respective transparent windows. The keys of at least two rows are formed between the openings of two rows, and the keys of at least two rows are formed outside of the openings of two rows.

The multifunction key pad display, according to aspects of the present invention, and the electronic device having the same, can easily and rapidly perform various input operations, and can display various information items. Therefore, the electronic device having the same is conveniently used.

The multifunction key pad display, according to aspects of the present invention, and the electronic device having the same, can change characters, such as, numbers, special signs, still images, and/or moving images, in accordance with the selection of a user, to display the changed characters.

The multifunction key pad display, according to aspects of the present invention, and the electronic device having the same, have low power consumption, and low manufacturing costs.

Additional aspects and/or advantages of the invention will be set forth in part in the description which follows and, in part, will be obvious from the description, or may be learned by practice of the invention.

BRIEF DESCRIPTION OF THE DRAWINGS

These and/or other objects and advantages of the invention will become apparent and more readily appreciated from the following description of the exemplary embodiments, taken in conjunction with the accompanying drawings, of which.

DETAILED DESCRIPTION OF THE EMBODIMENTS

Figure 1A:
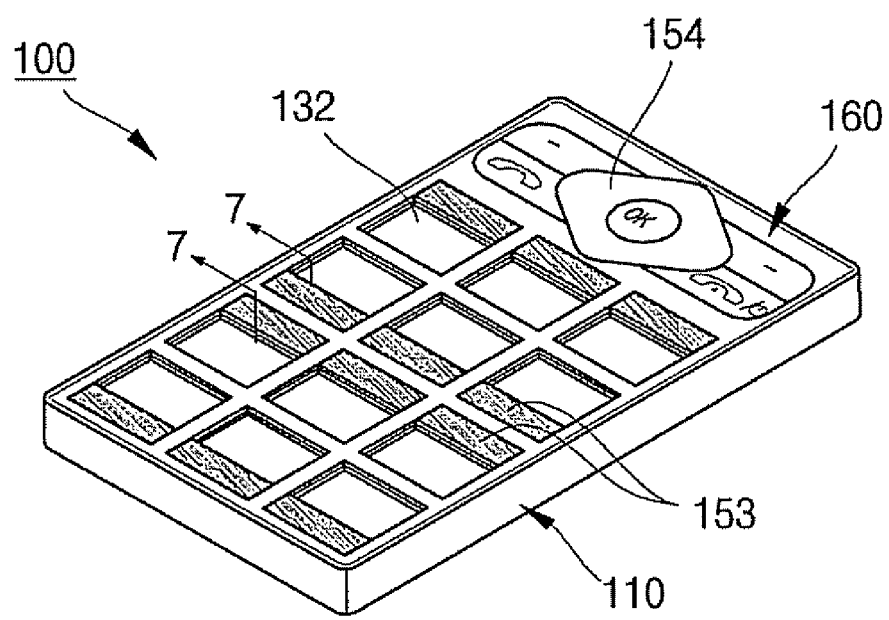
FIG. 1A is a perspective view illustrating a multifunction key pad display, according to an exemplary embodiment of the present invention.

Reference will now be made in detail to the exemplary present embodiments of the present invention, examples of which are illustrated in the accompanying drawings, wherein like reference numerals refer to the like elements throughout. The exemplary embodiments are described below, in order to explain the aspects of the present invention, by referring to the figures.

Figure 1B:
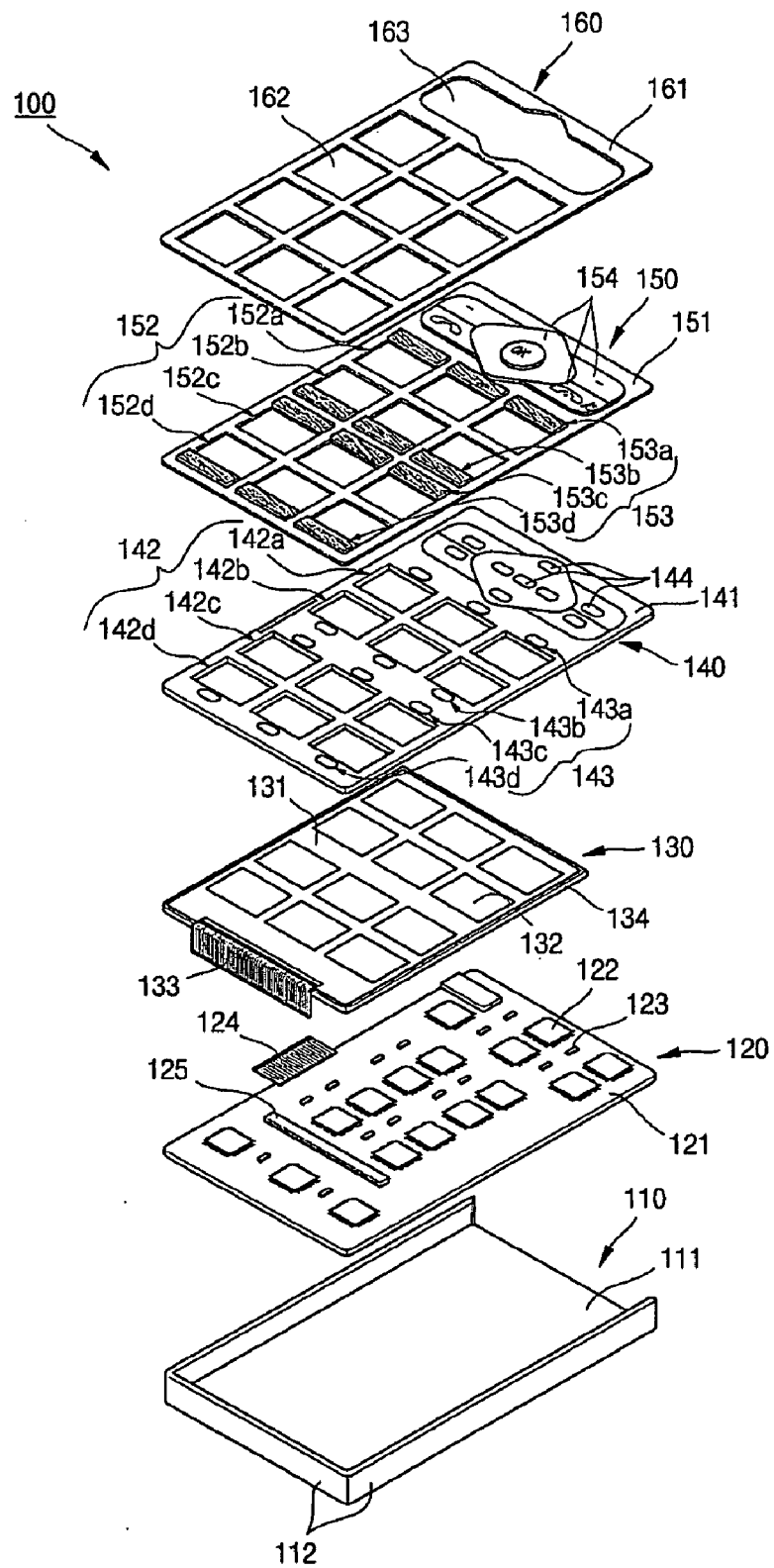
FIG. 1B is an exploded perspective view thereof.

FIG. 1A is a perspective view illustrating a multifunction key pad display 100, according to an exemplary embodiment of the present invention and FIG. 1B is an exploded perspective view thereof. Referring to FIGS. 1A and 1B, the multifunction key pad display 100 includes a case 110, a main printed circuit board 120 mounted on the case 110, a display panel 130 mounted on the main printed circuit board 120, a printed circuit board 140 mounted on the display panel 130, a pad 150 mounted on the printed circuit board 140, and a cover 160 mounted on the pad 150.

The case 110 includes a bottom surface 111 and a plurality of side walls 112 formed at the edges of the bottom surface 111, at a predetermined height. The case 110 can be formed of a plastic resin, a metal, or an equivalent thereof. However, the material of the case 110 is not limited thereto. The main printed circuit board 120, the display panel 130, the printed circuit board 140, the pad 150, and the cover 160 can be sequentially mounted on the case 110. A battery to power to the main printed circuit board 120, the display panel 130, and the printed circuit board 140 can be further mounted on the case 110. However, the battery is not shown in the drawings.

The main printed circuit board 120 includes a generally rectangular board body 121, a plurality of active components 122, a plurality of passive components 123, a first flexible printed circuit 124, and a connector 125. The main printed circuit board 120 supplies an electric signal to, or receives an electric signal from, the printed circuit board 140, or the main display panel of an electronic device (to be described later). The first flexible printed circuit 124 can be electrically connected to the printed circuit board 140 and a second flexible printed circuit 133 connected to the display panel 130 can be electrically connected to the connector 125.

The display panel 130 includes display regions 132 that are arranged in a matrix, and are bounded by non-display regions 131. The second flexible printed circuit 133 can be electrically connected to one side of the display panel 130. The bottom surface and the side surfaces of the display panel 130 can be surrounded by a bezel 134 made of a resin or a metal, so that the display panel 130 is not damaged by external shocks.

While 12 display regions 132 are shown on the display panel 130, the present invention is not limited to any particular number of display regions 132. That is, the number of display regions 132 can be larger or smaller than 12. The display regions 132 are generally rectangular. However, the display regions 132 are not limited to any particular shape. For example, the display regions 132 can be circular, triangular, pentagonal, hexagonal, a combination thereof, or the like.

Characters, such as, numbers, special signs, still images, or moving images, which can be freely changed in accordance with the selection of a user, can be output on the display regions 132. A user interface is shallow and the key operations can be easily performed. No images are output to the non-display regions 131, so as to minimize power consumption. Pixels can be formed in the display regions 132, to output light of predetermined colors (red, green, blue, or a mixture thereof), and the pixels are not be formed in the non-display regions 131. Therefore, in the display panel 130, power is consumed in the display regions 132 and power is not consumed in the non-display regions 131.

The display panel 130 can be a passive matrix organic light emitting display panel, an active matrix organic light emitting display panel, a liquid crystal display panel, or an equivalent thereof. However the kind of the display panel 130 is not limited to the above. The passive matrix organic light emitting display panel, the active matrix organic light emitting display panel, and the liquid crystal display panel will be described in detail, hereinafter.

The printed circuit board 140 includes a board body 141, in which openings 142 are formed in the regions corresponding to the display regions 132, and keys 143 formed in the regions corresponding to the non-display regions 131, at one side of each of the openings 142. The openings can be closed by a transparent resin, a transparent glass, or an equivalent thereof. Therefore, the display regions 132 of the display panel 130 can be completely separated from an external environment. A plurality of keys 144 (second keys) can be formed on the printed circuit board 140, in the regions that do not correspond to the display regions 132. That is, the keys 144 can be formed in the regions that do not correspond to the openings 142.

The printed circuit board 140 can be electrically connected to the main printed circuit board 120, by the first flexible printed circuit 124. Therefore, the operation signals of the keys 143 and 144, included in the printed circuit board 140, can be properly transmitted to the main printed circuit board 120, through the first flexible printed circuit 124.

The arrangements of the openings 142 and the keys 143, formed in and on the printed circuit board 140, will now be described in detail. The openings 142 can be divided into openings 142a in a first row, openings 142b in a second row, openings 142c in a third row, and openings 142d in a fourth row. The openings 142a, 142b, 142c, and 142d can also be arranged in columns that are perpendicular to the rows. The keys 143 can be arranged on the printed circuit board 140, in rows and columns that to correspond to the rows and columns of the openings 142. That is, keys 143 can be divided into keys 143a in a first row, keys 143b in a second row, keys 143c in a third row, and keys 143d in a fourth row. The keys 143a can correspond to the openings 142a. The keys 143b can correspond to the openings 142b. The keys 143c can correspond to the openings 142c. The keys 143d can correspond to the openings 142d.

The openings 142a and the openings 142b can be arranged between the keys 143a and the keys 143b. In other words, the keys 143a in the first row and the keys 143b in the second row can be arranged outside both the openings 142a in the first row and the openings 142b in the second row. Therefore, the distance between the respective openings 142a and the openings 142b can be smaller than the distance between the keys 143a and the keys 143b. The distance between the keys 143a and the keys 143b can be larger than the distance between the openings 142a and the openings 142b.

The keys 143b and the keys 143c can be arranged between the openings 142b and the openings 142c . In other words, the openings 142b in the second row and the openings 142c in the third row can be arranged outside the keys 143b in the second row and the keys 143c in the third row, e.g., so there are no rows of the openings between the first and second rows of the keys 143b and 143c , e.g., in an entire region extending between the adjacent first and second rows of keys 143b and 143c , as illustrated in FIG. 1B. Therefore, the distance between the keys 143b and the keys 143c can be smaller than the distance between the openings 142b and the openings 142c . The distance between the openings 142b and the openings 142c can be larger than the distance between the keys 143b and the keys 143c.

The openings 142c and the openings 142d can be arranged between the keys 143c and the keys 143d. In other words, the keys 143c in the third row and the keys 143d in the fourth row can be arranged outside the openings 142c in the third row and the openings 142d in the fourth row. Therefore, the distance between the openings 142c and the openings 142d can be smaller than the distance between the keys 143c and the keys 143d. The distance between the keys 143c and the keys 143d can be larger than the distance between the openings 142c and the openings 142d. The rows can be parallel to each other.

The pad 150 includes a pad body 151. The pad 150 has transparent windows 152 formed in regions corresponding to the openings 142 (regions corresponding to the display regions 132), and pressing units 153 formed in the regions corresponding to the keys 143, at one side of each of the transparent windows 152. Pressing units 154 can be formed on the pad 150, in regions that do not correspond to the display regions 132 of the display panel 130, or to the openings 142 of the printed circuit board 140. That is, the plurality of pressing units 154 can be formed in regions corresponding to the keys 144 of the printed circuit board 140. Characters can be formed on the surfaces of the pressing units 154, by raised engraving, depressed engraving, printing, or the like.

The transparent windows 152 can be closed by a transparent resin, a transparent glass, or an equivalent thereof. When a user presses the pressing units 153 and 154, the keys 143 and 144 are operated, and the operation signals of the keys 143 and 144 can be transmitted to the main printed circuit board 120, through the first flexible printed circuit 124.

The transparent windows 152 can be divided into transparent windows 152a in a first row, transparent windows 152b in a second row, transparent windows 152c in a third row, and transparent windows 152d in a fourth row. The transparent windows 152a, 152b, 152c, and 152d correspond to the openings 142a, 142b, 142c, and 142d of the circuit board 140.

The pressing units 153 can be divided into pressing units 153a disposed in a first row, pressing units 153b in a second row, pressing units 153c in a third row, and pressing units 153d in a fourth row. The pressing units 153a, 153b, 153c, and 153d correspond to the keys 143a, 143b, 143c, and 143d of the circuit board 140. The pressing units 153a, 153b, 153c, and 153d and the transparent windows 152a, 152b, 152c, and 152d can be also arranged in, for example, three columns.

The transparent windows 152a and the transparent windows 152b can be arranged between the pressing units 153a and the pressing units 153b. In other words, the pressing units 153a in the first row and the pressing units 153b in the second row can be arranged outside the transparent windows 152a in the first row and the transparent windows 152b in the second row. Therefore, the distance between the transparent windows 152a and the transparent windows 152b can be smaller than the distance between the pressing units 153a and the pressing units 153b. The distance between the pressing units 153a and the pressing units 153b can be larger than the distance between the transparent windows 152a and the transparent windows 152b.

The pressing units 153b and the pressing units 153c can be arranged between the transparent windows 152b and the transparent windows 152c. In other words, the transparent windows 152b in the second row and the transparent windows 152c in the third row can be arranged outside the pressing units 153b in the second row and the pressing units 153c in the third row. Therefore, the distance between the pressing units 153b and the pressing units 153c can be smaller than the distance between the transparent windows 152b and the transparent windows 152c. The distance between the transparent windows 152b and the transparent windows 152c can be larger than the distance between the pressing units 153b and the pressing units 153c.

The transparent windows 152c and the transparent windows 152d can be arranged between the pressing units 153c and the pressing units 153d. In other words, the pressing units 153c and the pressing units 153d in the fourth row can be arranged outside both the transparent windows 152c in the third row and the transparent windows 152d in the fourth row. Therefore, the distance between the transparent windows 152c and the transparent windows 152d can be smaller than the distance between the pressing units 153c and the pressing units 153d. The distance between the pressing units 153c and the pressing units 153d can be larger than the distance between the transparent windows 152c and the transparent windows 152d.

The pressing units 153 are arranged in parallel columns. The shapes of the pressing units 153 can be identical. The shapes of the pressing units 153 can correspond to the shapes of the transparent windows 152. The pressing units 153 can be rectangular, circular, or the like.

According to aspects of the present invention, an input operation can be rapidly and easily performed. That is, the pressing units 153 that are significantly related to each other can be arranged closer to each other. The pressing units 153 that are slightly related to each other are arranged to be further from each other, so that the operation of the pressing units 153 that are significantly related to each other is faster and easier. For example, when the pressing units 153 related to characters are arranged on one side, and the pressing units 153 related to numbers are arranged on the other side, the characters and the numbers can be rapidly and easily input.

The cover 160 includes a cover body 161. The cover 160 includes windows 162 formed in regions corresponding to the transparent windows 152 and the pressing units 153, of the pad 150. Therefore, the display regions 132 of the display panel 130 can be viewed through the windows 162. A user operates the pressing units 153 through the windows 162 of the cover 160, to input a command. A longitudinal window 163 that exposes the pressing units 154 can be formed in the cover 160. The pressing units 154 can include characters formed by raised engraving, depressed engraving, or printing. The windows 162 and 163 can be sealed by a transparent resin, a glass, or an equivalent thereof. The keys 143 and the pressing units 153 can together be referred to as buttons.

Figure 2A:
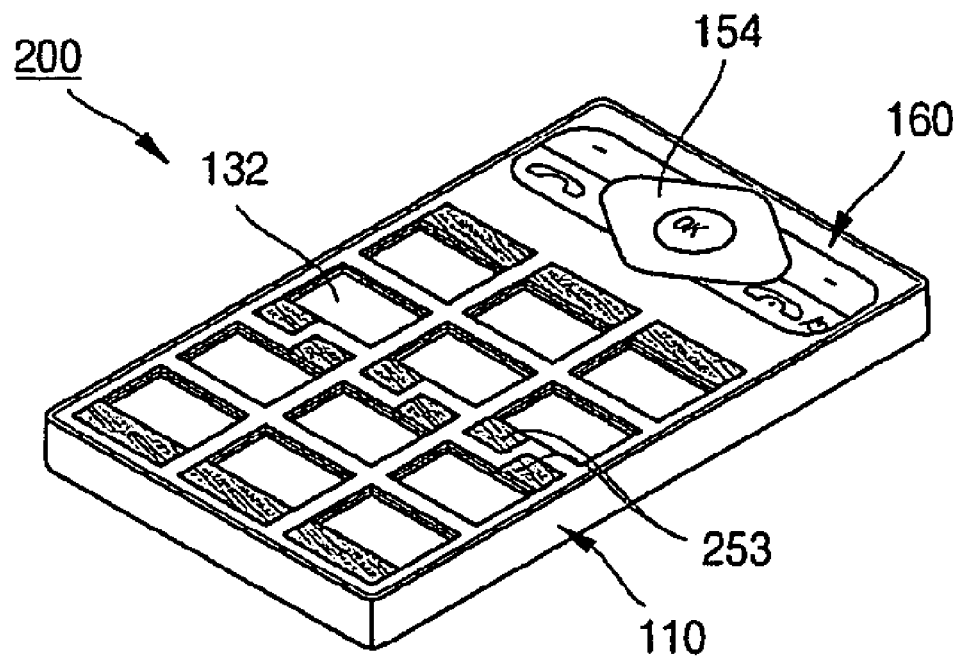
FIG. 2A is a combination perspective view illustrating a multifunction key pad display, according to another exemplary embodiment of the present invention.
Figure 2B:
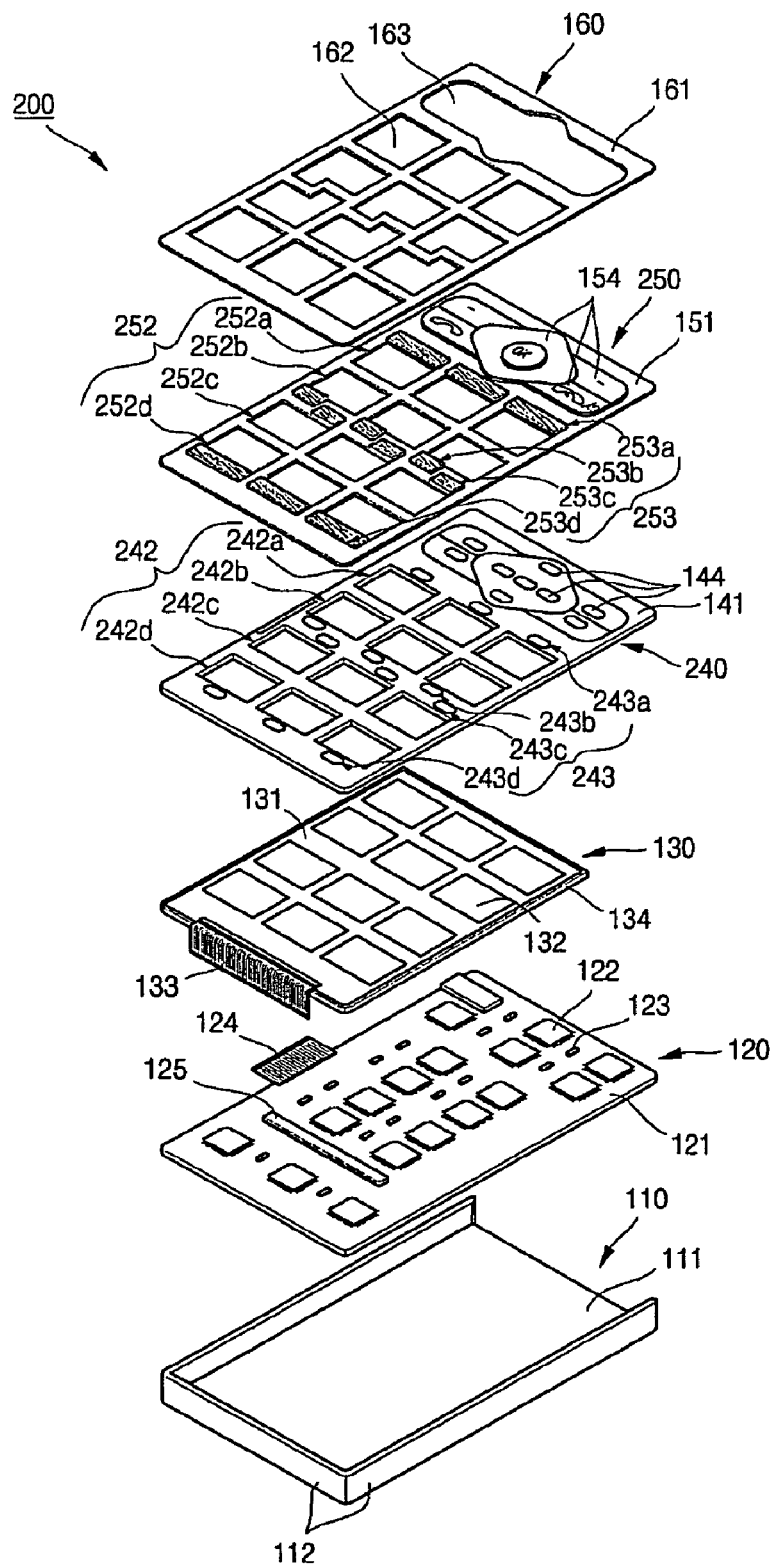
FIG. 2B is an exploded perspective view thereof.

FIG. 2A is a perspective view illustrating a multifunction key pad display 200, according to another exemplary embodiment of the present invention, and FIG. 2B is an exploded perspective view thereof. The multifunction key pad display 200 has a similar structure to the above-described multifunction key pad display 100. Therefore, differences between the multifunction key pad display 200 and the multifunction key pad display 100, will be mainly described.

The multifunction key pad display 200 can include keys 243 formed on a printed circuit board 240. The keys 243 can be arranged in rows and columns corresponding to openings 242. That is, the keys 243 can be divided into keys 243a in a first row, keys 243b in a second row, keys 243c in a third row, and keys 243d in a fourth row. The keys 243a can correspond to the openings 242a. The keys 243b can correspond to the openings 242b. The keys 243c can correspond to the openings 242c. The keys 243d can correspond to the openings 242d.

The openings 242a and the openings 242b can be arranged between the keys 243a and the keys 243b. In other words, the keys 243a in the first row and the keys 243b in the second row can be arranged outside both the openings 242a in the first row and the openings 242b in the second row. Therefore, the distance between the openings 242a and the openings 242b can be smaller than the distance between the keys 243a and the keys 243b. The distance between the keys 243a and the keys 243b can be larger than the distance between the openings 242a and the openings 242b.

The keys 243b and the keys 243c can be arranged between the openings 242b and the openings 242c. In other words, the openings 242b in the second row and the openings 242c in the third row can be arranged outside both the keys 243b in the second row and the keys 243c in the third row. Therefore, the distance between the keys 243b and the keys 243c can be smaller than the distance between the openings 242b and the openings 242c in the third row. The distance between the openings 242b and the openings 242c can be larger than the distance between the keys 243b and the keys 243c.

The keys 243b and the keys 243c can be arranged in different columns. For example, the keys 243b and the keys 243c can be diagonal to one another. The keys 243b correspond to the openings 242b and the keys 243c correspond to the openings 242c. The distance between the openings 242b and the openings 242c is minimized, so that an input operation can be easily performed.

The openings 242c and the openings 242d can be arranged between the keys 243c and the keys 243d. In other words, the keys 243c in the third row and the keys 243d in the fourth row can be arranged outside both the openings 242c in the third row and the openings 242d in the fourth row. Therefore, the distance between the openings 242c and the openings 242d can be smaller than the distance between the keys 243c and the keys 243d. The distance between the keys 243c and the keys 243d can be larger than the distance between the openings 242c and the openings 242d.

The keys 243a and 243d in the first and fourth rows can be arranged in the same columns. The keys 243a and 243b in the first and second rows can be arranged in the same columns. The keys 243b and 243d in the second and fourth rows can be arranged in the same columns. The keys 243b and 243c in the second and third rows can be arranged in different columns.

Pressing units 253a, 253b, 253c, and 253d can be arranged in a pad 250. The pressing units 253a correspond to the transparent windows 252a, the pressing units 253b correspond to the transparent windows 252b, the pressing units 253c correspond to the transparent windows 252c, and the pressing units 253d correspond to the transparent windows 252d. The transparent windows 252a, 252b, 252c, and 252d can be arranged in, for example, three columns.

The transparent windows 252a and the transparent windows 252b can be arranged between the pressing units 253a and the pressing units 253b. In other words, the pressing units 253a in the first row and the pressing units 253b in the second row can be arranged outside both the transparent windows 252a in the first row and the transparent windows 252b in the second row. Therefore, the distance between the transparent windows 252a and the transparent windows 252b can be smaller than the pressing units 253a and the pressing units 253b. The distance between the pressing units 253a and the pressing units 253b can be larger than the distance between the transparent windows 252a and the transparent windows 252b.

The pressing units 253b and the pressing units 253c can be arranged between the transparent windows 252b and the transparent windows 252c. In other words, the transparent windows 252b in the second row and the transparent windows 252c in the third row can be arranged outside both the pressing units 253b in the second row and the pressing units 253c in the third row. Therefore, the distance between the pressing units 253b and the pressing units 253c can be smaller than the distance between the transparent windows 252b and the transparent windows 252c. The distance between the transparent windows 252b and the transparent windows 252c can be larger than the distance between the pressing units 253b and the pressing units 253c. The length of the pressing units 253b and the pressing units 253c can be about half of the length of the pressing units 253a and the pressing units 253d. In other words, the pressing units 253b and 253c can be about half the size of the pressing units 253a and 253d.

The transparent windows 252c and the transparent windows 252d can be arranged between the pressing units 253c and the pressing units 253d. In other words, the pressing units 253c in the third row and the pressing units 253d in the fourth row can be arranged outside both the transparent windows 252c in the third row and the transparent windows 252d in the fourth row. Therefore, the distance between the transparent windows 252c and the transparent windows 252d can be smaller than the distance between the pressing units 253c and the pressing units 253d. The distance between the pressing units 253c and the pressing units 253d can be larger than the distance between the transparent windows 252c and the transparent windows 252d.

The pressing units 253a and 253d in the first and fourth rows can be arranged in the same columns. The pressing units 253a and 253b in the first and second rows can be arranged in the same columns. The pressing units 253b and 253d in the second and fourth rows can be arranged in the same columns. The pressing units 253b and 253c can be arranged in different columns. That is, the pressing units 253b and 253c in the second and third rows are in different columns than the pressing units 253a and 253d in the first and fourth rows.

Figure 3A:
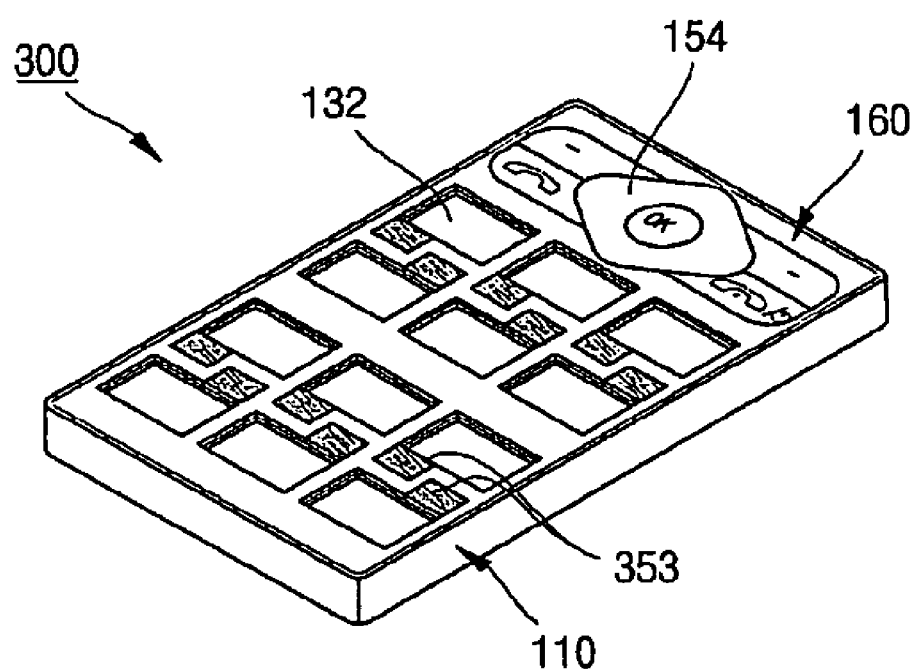
FIG. 3A is a combination perspective view illustrating a multifunction key pad display, according to another exemplary embodiment of the present invention.
Figure 3B:
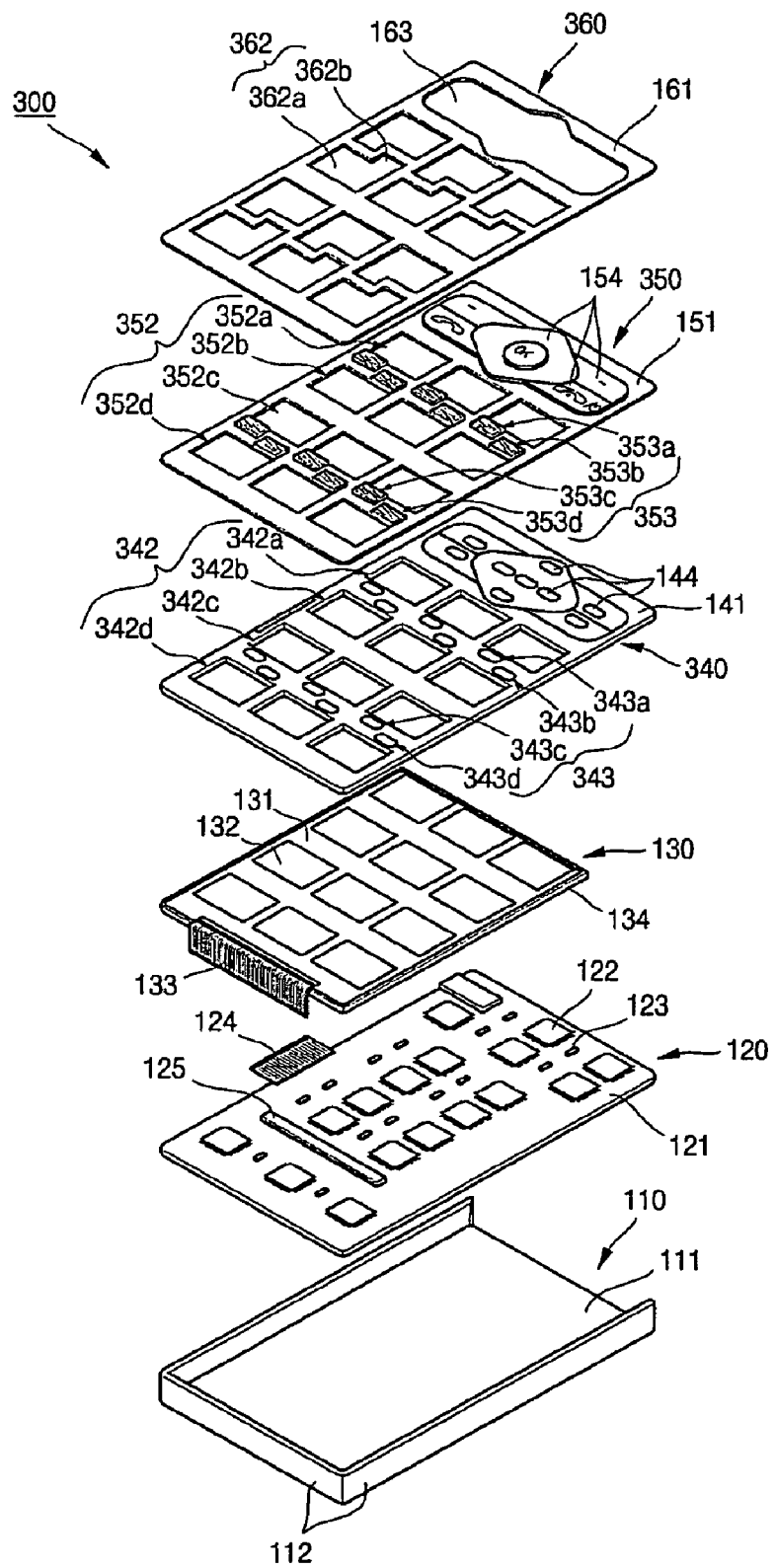
FIG. 3B is an exploded perspective view thereof.

FIG. 3A is a combination perspective view illustrating a multifunction key pad display 300, according to another exemplary embodiment of the present invention, and FIG. 3B is an exploded perspective view thereof. As illustrated in FIGS. 3A and 3B, the multifunction key pad display 300 has a similar structure to the above-described multifunction key pad display 200. Therefore, a difference between the multifunction key pad display 300 and the multifunction key pad display 200 will be mainly described.

The multifunction key pad display 300 includes keys 343 that are arranged in a matrix on a printed circuit board 340, and which correspond to openings 342. The keys 343 can be divided into keys 343a in a first row, keys 343b in a second row, keys 343c in a third row, and keys 343d in a fourth row. The keys 343a can correspond to the openings 342a. The keys 243b can correspond to the openings 342b. The keys 343c can correspond to the openings 342c. The keys 343d can correspond to the openings 342d.

The keys 343a and the keys 343b can be arranged between the openings 342a and the openings 342b. In other words, the openings 342a in the first row and the openings 342b in the second row can be arranged outside both the keys 343a in the first row and the keys 343b in the second row. Therefore, the distance between the keys 343a and the keys 343b can be smaller than the distance between the openings 342a and the openings 342b. The distance between the openings 342a and the openings 342b can be larger than the distance between the keys 343a and the keys 343b.

The openings 342b and the openings 342c can be arranged between the keys 343b and the keys 343c. In other words, the keys 342b in the second row and the keys 342c in the third row can be arranged outside both the openings 343b in the second row and the openings 343c in the third row. Therefore, the distance between the keys 343b and the keys 343c can be larger than the distance between the openings 342b and the openings 342c. The distance between the openings 342b and the openings 342c can be smaller than the distance between the keys 343b and the keys 343c.

The keys 343c and the keys 343d can be arranged between the openings 342c and the openings 342d. In other words, the openings 342c in the third row and the openings 342d in the fourth row can be arranged outside both the keys 343c in the third row and the keys 343d in the fourth row. Therefore, the distance between the keys 343c and the keys 343d can be smaller than the distance between the openings 342c and the openings 342d. The distance between the openings 342c and the openings 342d can be larger than the distance between the keys 343c and the keys 343d.

The keys 343a and the keys 343c can be arranged in the same columns. The keys 343b and the keys 343d can be arranged in the same columns. Furthermore, the keys 343a and the keys 343b can be arranged in different columns. The keys 343c and the keys 343d are arranged in different columns. The keys 343a and the keys 343b can be diagonal to one another. The keys 343c and the keys 343d can be diagonal to one another.

The multifunction key pad display 300 includes pressing units 353 arranged on a pad 350. The pressing units 353 can be divided into pressing units 353a in a first row, pressing units 353b in a second row, pressing units 353c in a third row, and pressing units 353d in a fourth row. The pressing units 353a correspond to the transparent windows 352a, the pressing units 353b correspond to the transparent windows 352b, the pressing units 353c correspond to the transparent windows 352c, and the pressing units 353d correspond to the transparent windows 352d. The transparent windows 352a, 352b, 352c, and 352d can be arranged in, for example, three columns.

The pressing units 353a and the pressing units 353b can be arranged between the transparent windows 352a and the transparent windows 352b. In other words, the pressing units 353a in the first row and the pressing units 353b in the second row can be arranged between the transparent windows 352a in the first row and the transparent windows 352b in the second row. Therefore, the distance between the transparent windows 352a and the transparent windows 352b can be larger than the distance between the pressing units 353a and the pressing units 353b. The distance between the pressing units 353a and the pressing units 353b can be smaller than the distance between the transparent windows 352a and the transparent windows 352b.

The transparent windows 352b and the transparent windows 352c can be arranged between the pressing units 353b and the pressing units 353c. In other words, the transparent windows 352b in the second row and the transparent windows 352c in the third row can be arranged between the pressing units 353b in the second row and the pressing units 353c in the third row. Therefore, the distance between the transparent windows 352b and the transparent windows 352c can be smaller than the distance between the pressing units 353b and the pressing units 353c. The distance between the pressing units 353b and the pressing units 353c can be larger than the distance between the transparent windows 352b and the transparent windows 352c in the third row.

The pressing units 353c and the pressing units 353d can be arranged between the transparent windows 352c and the transparent windows 352d. In other words, the transparent windows 352c in the third row and the transparent windows 352d in the fourth row can be arranged outside both the pressing units 353c in the third row and the pressing units 353d in the fourth row. Therefore, the distance between the transparent windows 352c and the transparent windows 352d can be larger than the distance between the pressing units 353c and the pressing units 353d in the fourth row. The distance between the pressing units 353c and the pressing units 353d can be smaller than the distance between the transparent windows 352c and the transparent windows 352d.

The pressing units 353a and 353c in the first and third rows can be arranged in the same columns. The pressing units 353a and 353d in the second and fourth rows can be arranged in the same columns. The pressing units 353a and 353c in the first and third rows can be arranged in the same columns. The pressing units 353a and 353b in the first and second rows can be arranged in different columns. Some of the pressing units 353c and 353d in the third and fourth rows can be arranged in different columns.

The length of the pressing units 353 can be about half of the length of the transparent windows 352. The pressing units 353a and 353b are arranged adjacent to and between the transparent windows 352a and 352b, respectively. The pressing units 353c and 353d are arranged adjacent to and between the transparent windows 352c and 352d, respectively.

A cover 360 is positioned on the pad 350 and windows 362 can be formed in the cover 360 in the regions corresponding to the transparent windows 352 and the pressing units 353. The windows 362 can include rectangular first regions 362a and smaller, rectangular second regions 362b connected to the first regions 362a. The first regions 362a correspond to the windows 352 of the pad 350, and the second regions 362b correspond to the pressing units 353. The cover 160 includes a cover body 161 forming a boundary between the windows 362.

Figure 4:
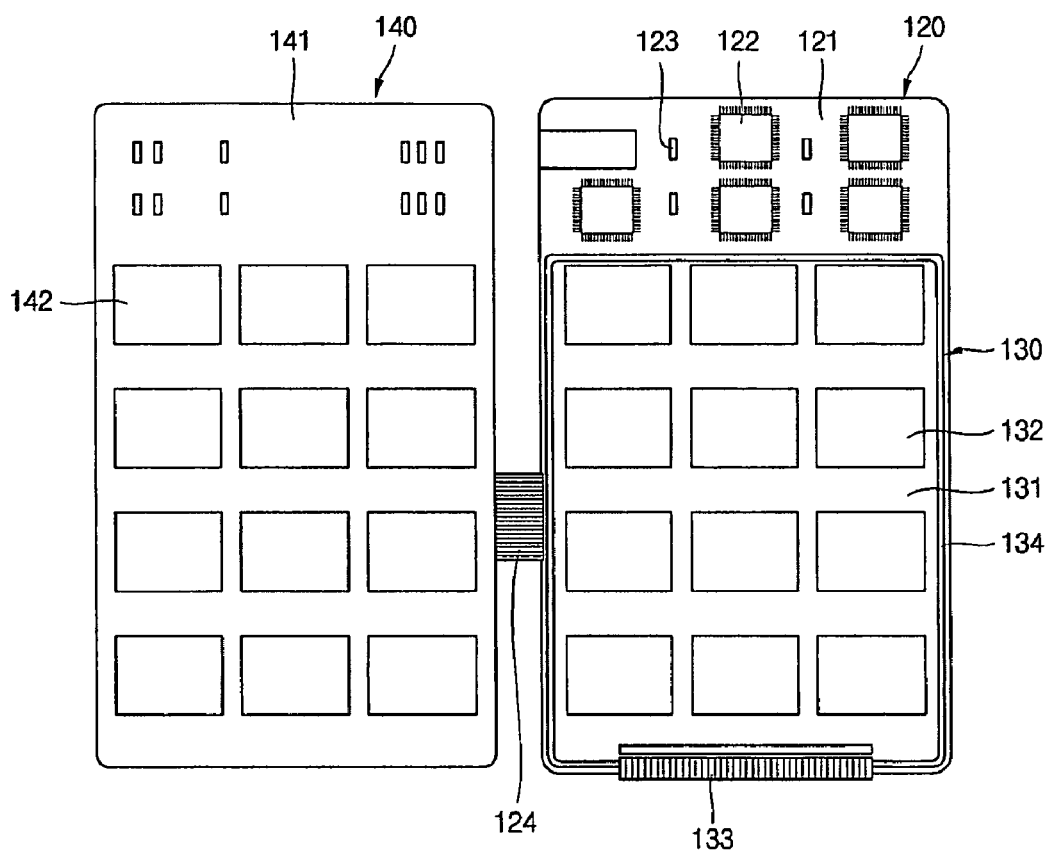
FIG. 4 is a plan view illustrating a display panel is mounted on a main printed circuit board, in a multifunction key pad display, according to aspects of the present invention.

FIG. 4 is a plan view illustrating the display panel 130 mounted on the main printed circuit board 140, of the multifunction key pad display 100. Only the multifunction key pad display 100 is described, from among the various exemplary embodiments, in order to avoid redundancy.

As illustrated in FIG. 4, the display panel 130 can be mounted on the main printed circuit board 120. The display panel 130 can be electrically connected to the main printed circuit board 120, through the second flexible printed circuit 133. The printed circuit board 140 can be electrically connected to the main printed circuit board 120, through the first flexible printed circuit 124. The display regions 132 formed in the display panel 130 can be formed in the positions corresponding to the openings 142 formed in the printed circuit board 140.

Figure 5:
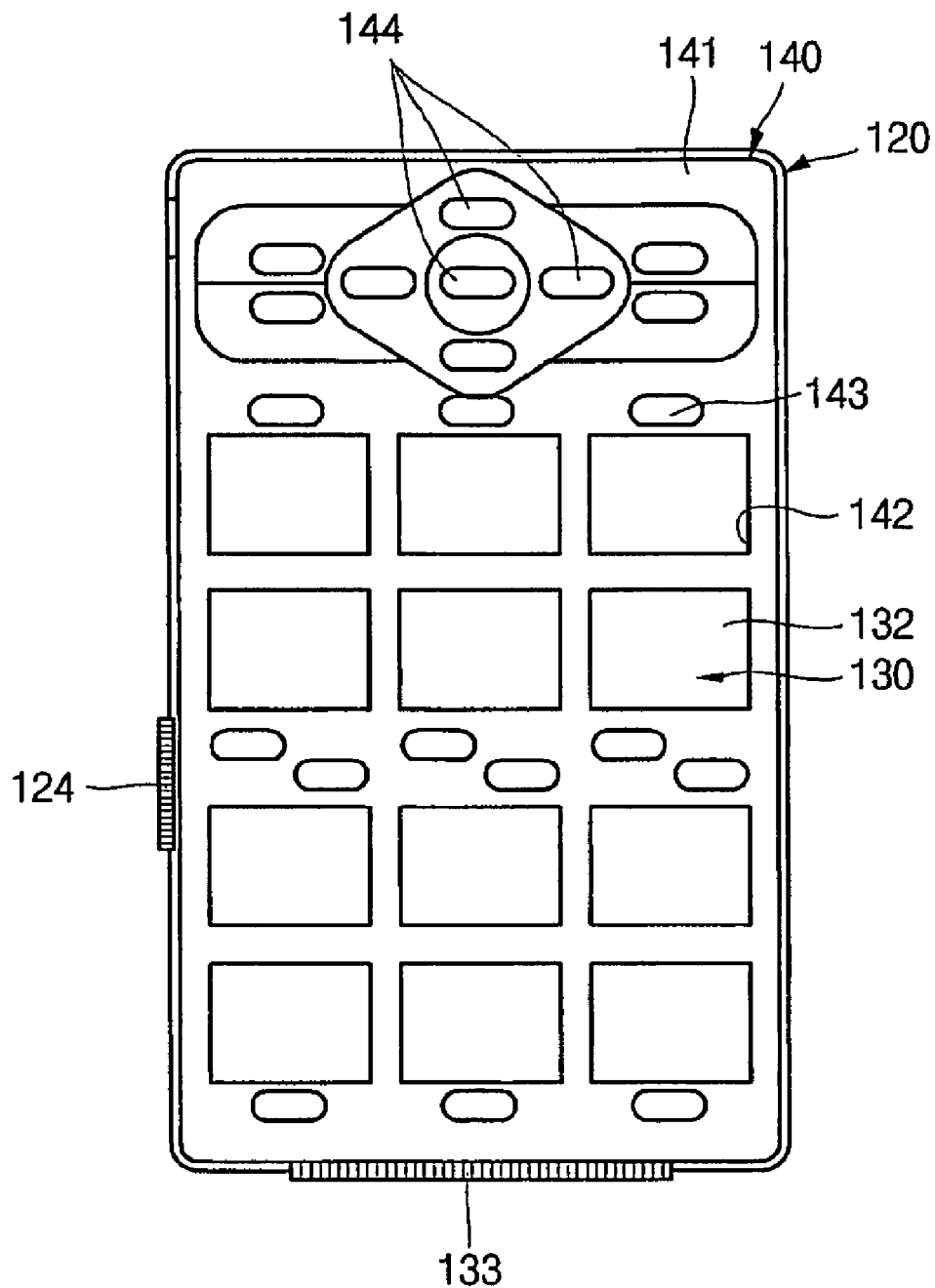
FIG. 5 is a plan view illustrating a display panel and a printed circuit board mounted on a main printed circuit board, in the multifunction key pad display, according to aspects of the present invention.

FIG. 5 is a plan view illustrating the display panel 130 mounted to the printed circuit board 140 and the main printed circuit board 120. As illustrated in FIG. 5, the display panel 130 and the printed circuit board 140 can be sequentially mounted on the main printed circuit board 120. The printed circuit board 140 can also be electrically connected to the main printed circuit board 120, through the first flexible printed circuit 124. The display regions 132 of the display panel 130 can be exposed to the outside, through the openings 142 formed in the printed circuit board 140. A user can operate keys while looking at various characters, numbers, special characters, still images, and moving images displayed on the display regions 132. The keys 143 can be disposed at edges of the openings 142.

Figure 6:
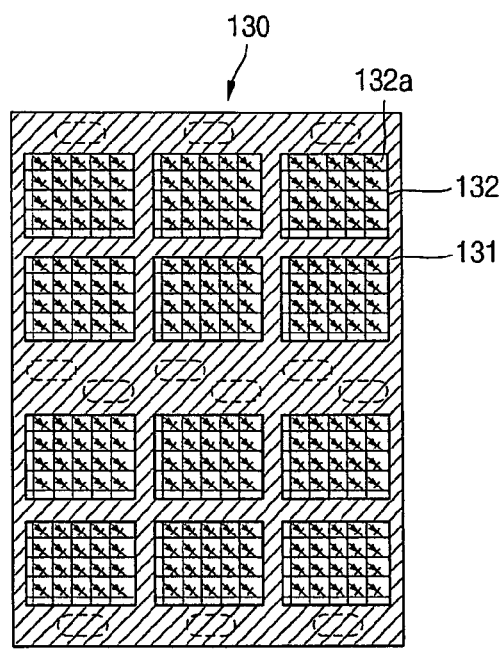
FIG. 6 is a schematic plan view illustrating display regions and non-display regions formed in a display panel of the multifunction key pad display, according to aspects of the present invention.

FIG. 6 is a schematic plan view illustrating display regions 132 and non-display regions 131 formed in the display panel 130 in the multifunction key pad display 100. As illustrated in FIG. 6, the display panel 130 can include the non-display regions 131, on which nothing is displayed, and the display regions 132 on which characters, such as, numbers, special characters, still images, or moving images are displayed. The display regions 132 can be arranged in a matrix of rows and columns. Pixels 132a are formed in the display regions 132 and the pixels are not formed in the non-display regions 131.

Although the size of the display panel 130 is large, the electrode resistance and the capacitance of light emitting layers do not significantly increase. For example, when the area of the display panel 130 is 20 cm2 (for example, 4 cm*5 cm), the area of one display region 132 is 1 $cm^2$, the number of display regions 132 is 12, and the area of the display regions 132 is 12 $cm^2$. Therefore, power is only consumed in the display regions 132 which cover 12 $cm^2$. That is, in terms of power consumption, the area of the display panel 130 is not 20 $cm^2$, but rather, 12 $cm^2$.

The elliptical portions in FIG. 6 illustrate the regions corresponding to the keys 143 of the printed circuit board 140. That is, the keys 143 of the printed circuit board 140 that are pressed by the user correspond to the non-display regions 131, rather than the display regions 132. In other words, the pixels are not formed in the regions corresponding to the keys 143 of the printed circuit board 140, in the display panel 130.

Figure 7:
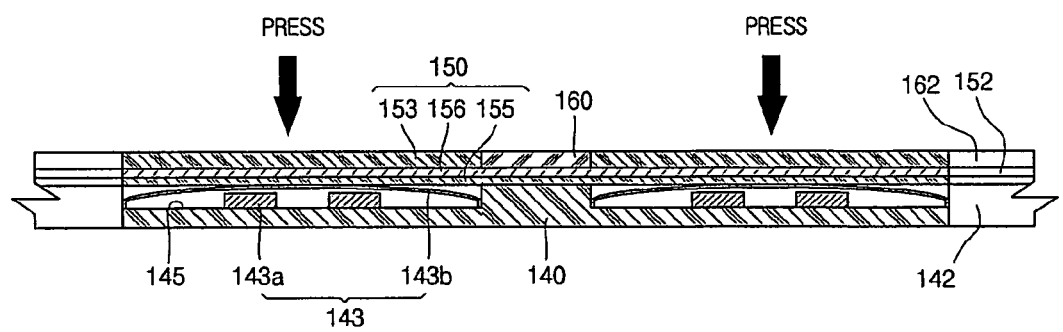
FIG. 7 is a partial sectional view taken along the line 7-7 of FIG. 1.

FIG. 7 is a partial sectional view taken along the line 7-7 of FIG. 1. As illustrated in FIG. 7, the keys 143, which are positioned in the regions corresponding to the non-display regions 131 of the display panel 130, can be dome switches, or equivalents thereof. However, any suitable type of key can be used. The keys 143 can include at least one conductive pattern 143a formed on the printed circuit board 140. Elastic members 143b can selectively contact the conductive patterns 143a. The elastic members 143b can be formed of a conductor or conductive layers can be formed on the internal surfaces of the elastic members 143b. Cavities 145 are formed in the regions where the keys 143 are formed in the printed circuit board 140. However, the cavities 145 are optional.

The pad 150, positioned on the printed circuit board 140, can have a multiple layer structure. The present invention is not limited to any particular pad. The pad 150 can include an insulation layer 155, which can be connected to the printed circuit board 140, or to the keys 143. A thin metal layer 156 formed on the insulation layer 155, and the pressing units 153 are formed on the metal layer 156, in regions corresponding to the keys 143. The insulation layers 155 are used to attach the pad 150 to the printed circuit board 140 and the keys 143. The metal layer 156 secures the stiffness of the pad 150. The pressing units 153 transmit pressure applied by a user, to the keys 143. The pressing units 153 can be formed of a resin, a metal, or an equivalent thereof. However, the material thereof is not so limited. The pressing units 153 protrude upward, to be easily pressed by the user. The cover 160 is mounted on the pad 150, and the pressing units 153 are exposed through the windows 162 formed in the cover 160. The thickness of the pressing units 153 can be controlled, such that the pressing units 153 may, or may not, protrude from the pad 150.

Figure 8:
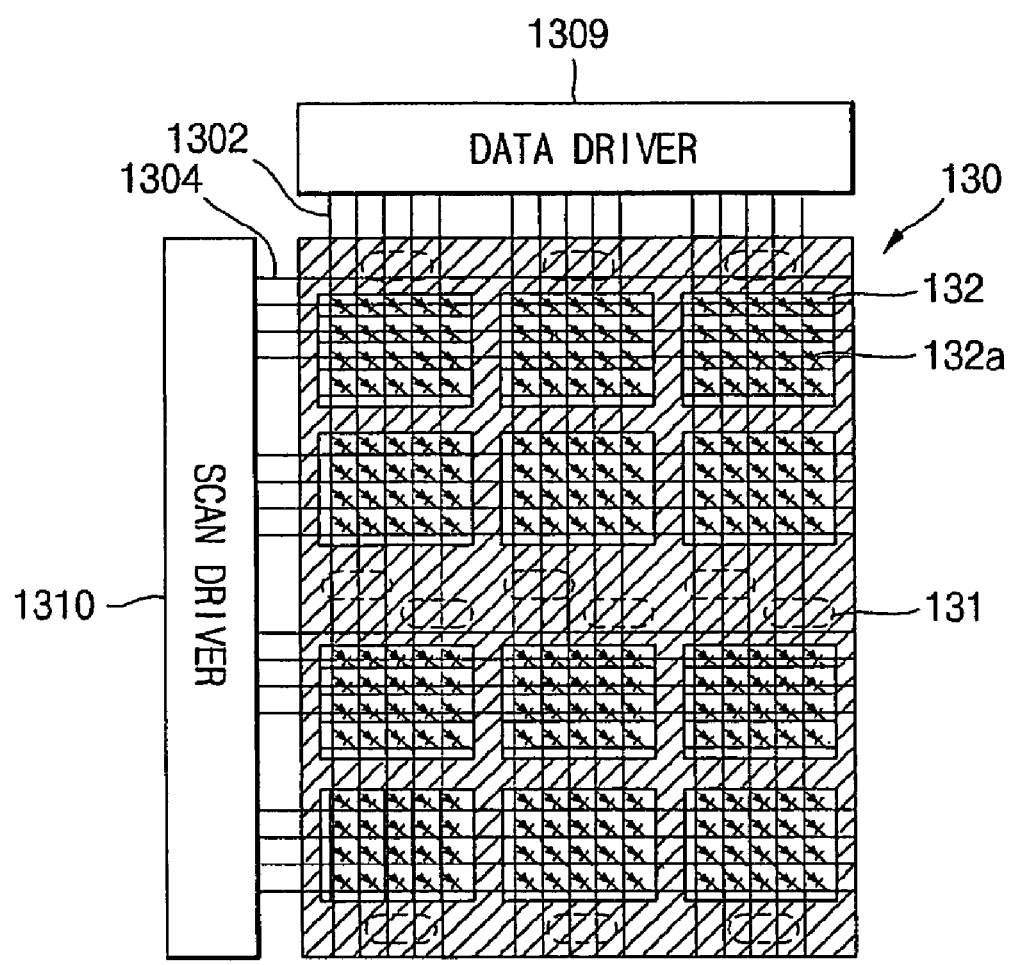
FIG. 8 is a schematic view illustrating the structure of a display panel of the display of a multifunction key pad display, according to aspects of the present invention.

FIG. 8 is a schematic view illustrating the structure of the display panel 130 of the multifunction key pad display 100. As illustrated in FIG. 8, the display panel 130 includes the plurality of non-display regions 131 and display regions 132. Pixels 132a can be formed in the display regions 132. First electrodes 1302 and second electrodes 1304 can be formed in the display regions 132. A data driver 1309 applies data signals to the display regions 132, and is electrically connected to the first electrodes 1302. A scan driver 1310 applies scan signals to the display regions 132, and is electrically connected to the second electrodes 1304. The data driver 1309 can be referred to as a source driver, or a column driver. The scan driver 1310 can be referred to as a gate driver, or a row driver.

The pixels 132a are formed only in the display regions 132. Therefore, power consumption is lower and product yield is larger, than in the case where the pixels 132a are formed over the entire display panel 130. Therefore, manufacturing costs are reduced.

The elliptical regions correspond to the regions where the keys 143 are formed in the printed circuit board 140. The keys 143 correspond to the non-display regions 131, so that it is possible to prevent the display regions 132 from being damaged when the keys 143 are operated.

Figure 9:
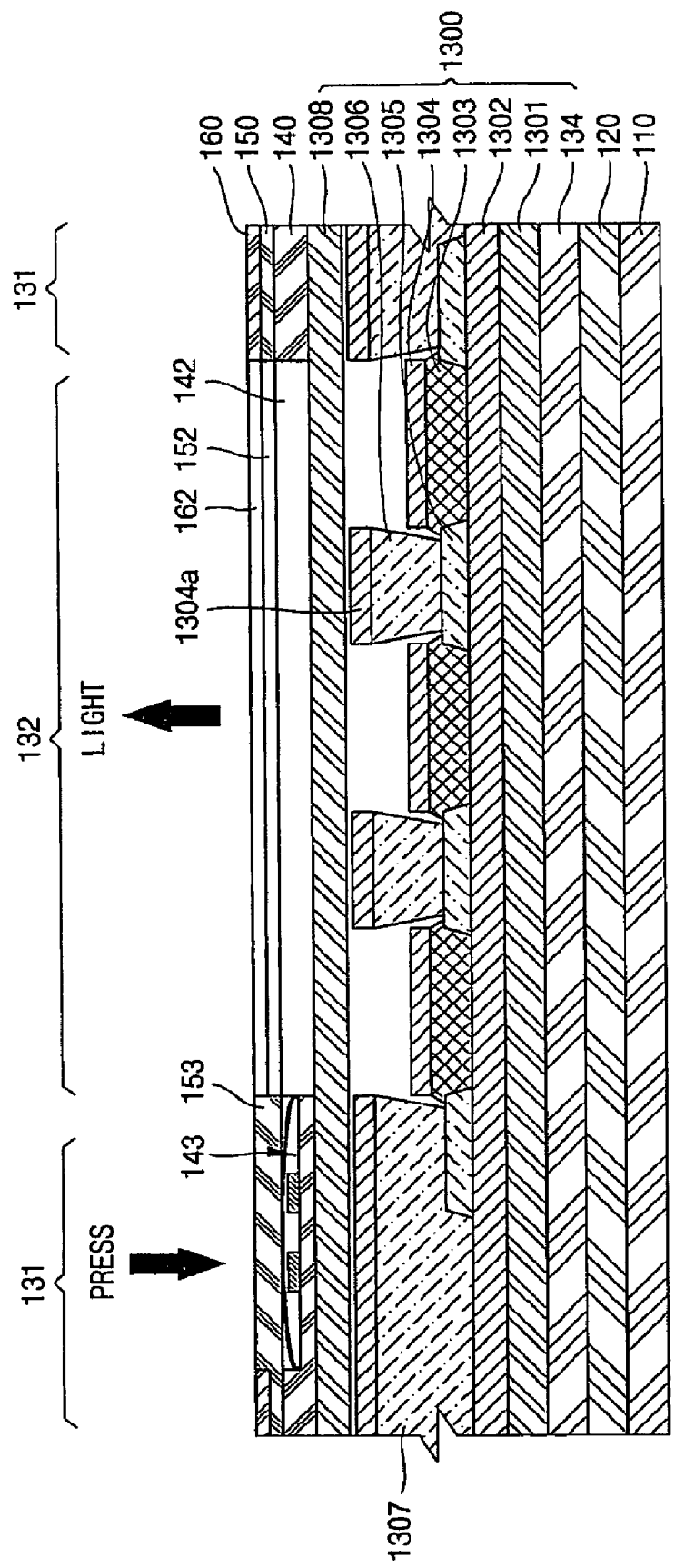
FIG. 9 is a sectional view illustrating an example of a display panel of a multifunction key pad display, according to aspects of the present invention.

FIG. 9 is a sectional view illustrating an example of the multifunction key pad display, according to aspects of the present invention. The multifunction key pad display includes a display panel 1300 including a first electrode 1302, three light emitting layers 1303, and three second electrodes 1304, however, other numbers of these components can be included. The length of the keys 143 is similar to the length of the light emitting layers 1303, and/or the second electrodes 1304. However, the length of the keys 143 may be actually much larger or smaller than the length of the light emitting layer 1303, and/or the second electrode 1304. The display panel 1300 is a passive matrix organic light emitting display. However, the display panel 1300 is not limited to the passive matrix organic light emitting display.

The display panel 1300 includes a first substrate 1301. The first electrode 1302 is formed on the first substrate 1301, the light emitting layers 1303 are formed on the first electrode 1302, the second electrodes 1304 are formed on the light emitting layers 1303, insulation layers 1305 are formed between the second electrodes 1304, first separators 1306 are formed on the insulation layers 1305, and second separators 1307 are formed on the edges the second electrodes 1304. The second separators are wider than the first separators 1306.

The first electrodes 1302, the light emitting layers 1303, the second electrodes 1304, and the first separators 1306 are formed in the display regions 132. The light emitting layers 1303 are not formed in the non-display regions 131. Images are displayed in the display regions 132. However, no image is output in the non-display regions 131.

The first substrate 1301 can be formed of a glass, a plastic resin, a nano compound, a metal, or an equivalent thereof. The first electrodes 1302 can be a silicon oxide layer, a silicon nitride layer, or a silicon oxynitride layer, formed on the first substrate 1301. The first electrodes 1302 can be formed of indium tin oxide (ITO), ITO/Ag, ITO/Ag/ITO, ITO/Ag/indium zinc oxide (IZO), or an equivalent thereof. However, the material of the first electrodes 1302 is not limited to the above. The first electrodes 1302 have a large work function, and are generally formed of a material having a low hole injecting barrier, with respect to the light emitting layers 1303. The first electrodes 1302 reflect light from the light emitting layers 1303, in a front-emission type display.

The light emitting layers 1303 can be formed on the first electrodes 1302. The light emitting layers 1303 emit red, green, and blue light. However, the color of the light emitted by the light emitting layers 1303 is not limited to the above. The light emitting layers 1303 can include a hole transport layer (HTL), an emitting layer (EML) in which electrons and holes are combined to form exitions, and an electron transport layer (ETL) that facilitates the movement of electrons. An electron injecting layer (EIL) that improves the injection of electrons is formed in the ETL, and a hole injecting layer (HIL) that improves the injection effect of holes is formed in the HTL. However, the structure of the light emitting layers 1303 is not limited to the above.

The second electrodes 1304 can be formed on the light emitting layers 1303, across the first electrodes 1302. The second electrodes 1304 can be formed of Al, LiF, an MgAg alloy, an MgCa alloy, or an equivalent thereof. However, the material of the second electrodes 1304 is not limited to the above. When the front emission type is selected, the thickness of the Al is generally very thin. In such a case, resistance increases, so that the electron injecting barrier increases. Therefore, the second electrodes 1304 are generally formed of the LiF, the MgAg alloy, or the MgCa alloy.

The insulation layers 1305 are formed between the light emitting layers 1303, to physically and electrically isolate the light emitting layers 1303. The light emitting layers 1303 can be formed of a polyimide, or an equivalent thereof. However, the material of the light emitting layers 1303 is not limited to the above.

The first separators 1306 are formed between the second electrodes 1304 (between the light emitting layers 1303), to physically isolate the second electrodes 1304. The thickness of the first separators 1306 is larger than the thickness of the light emitting layers 1303. The first separator 1306 can be trapezoidal, so that the upper side of the first separator 1306 is larger than the lower side thereof. However, the shape of the separator is not limited thereto. The first separators 1306 can be formed by exposing and developing a photoresist. However, the present invention is not limited to such a material and/or manufacturing method.

The second separators 1307 can be formed on the edges of the display regions 132. That is, the second separators 1307 can be formed on the edges of the light emitting layers 1303. The second separators 1307 can have larger width than the width of the first separators 1306. The non-display regions 131 can be defined by the second separators 1307. The light emitting layers 1303 and the first separators 1306 are positioned in the display regions 132. The second separators 1307 are disposed in the non-display regions 131. Second electrodes 1304a can optionally be formed on the top surfaces of the first separators 1306 and the second separators 1307.

A transparent second substrate 1308 can be formed on the first separators 1306 and the second separators 1307. The second substrate 1308 may or may not be connected to the first separators 1306 and/or the second separators 1307. The second substrate 1308 prevents external moisture and/or dust from reaching the light emitting layers 1303. The second substrate 1308 is also referred to as a sealing substrate.

The printed circuit board 140, which has the openings 142 and the keys 143, can be positioned on the second substrate 1308. The size of the openings 142 is almost the same as the size of the display regions 132. The pad 150, which has the transparent windows 152 and the pressing units 153, can be positioned on the printed circuit board 140. The size of the transparent windows 152 is almost the same as the size of the openings 142. The cover 160, which has the windows 162, can be positioned on the pad 150. The total area of the windows 162 is almost the same as the total area of the transparent windows 152 and the pressing units 153. In other words, the pressing units 153 can be exposed to the outside, through the windows 162. The openings 142, the transparent windows 152, and/or the windows 162 may be closed by a transparent resin, a transparent glass, or an equivalent thereof, in order to protect the display regions 132.

The display panel 1300 is divided into non-display regions 131 and display regions 132. Keys 143, formed on the printed circuit board 140, can be positioned to correspond to the non-display regions 131. The keys 143 can be formed to correspond to the second separators 1307. The second separators 1307 are thicker than the light emitting layers 1303, and are wider than the first separators 1306. Therefore, when a user presses the pressing units 153, to activate the keys 143, the second substrate 1308 and the second separators 1307 absorb the pressure, to buffer and support the display regions 132. Therefore, the display regions are not damaged when the keys 143 are operated.

A bezel 134 is positioned under the first substrate 1301. A main printed circuit board 120 is positioned under the bezel 134, and a case 110 is positioned under the main printed circuit board 120.

Figure 10:
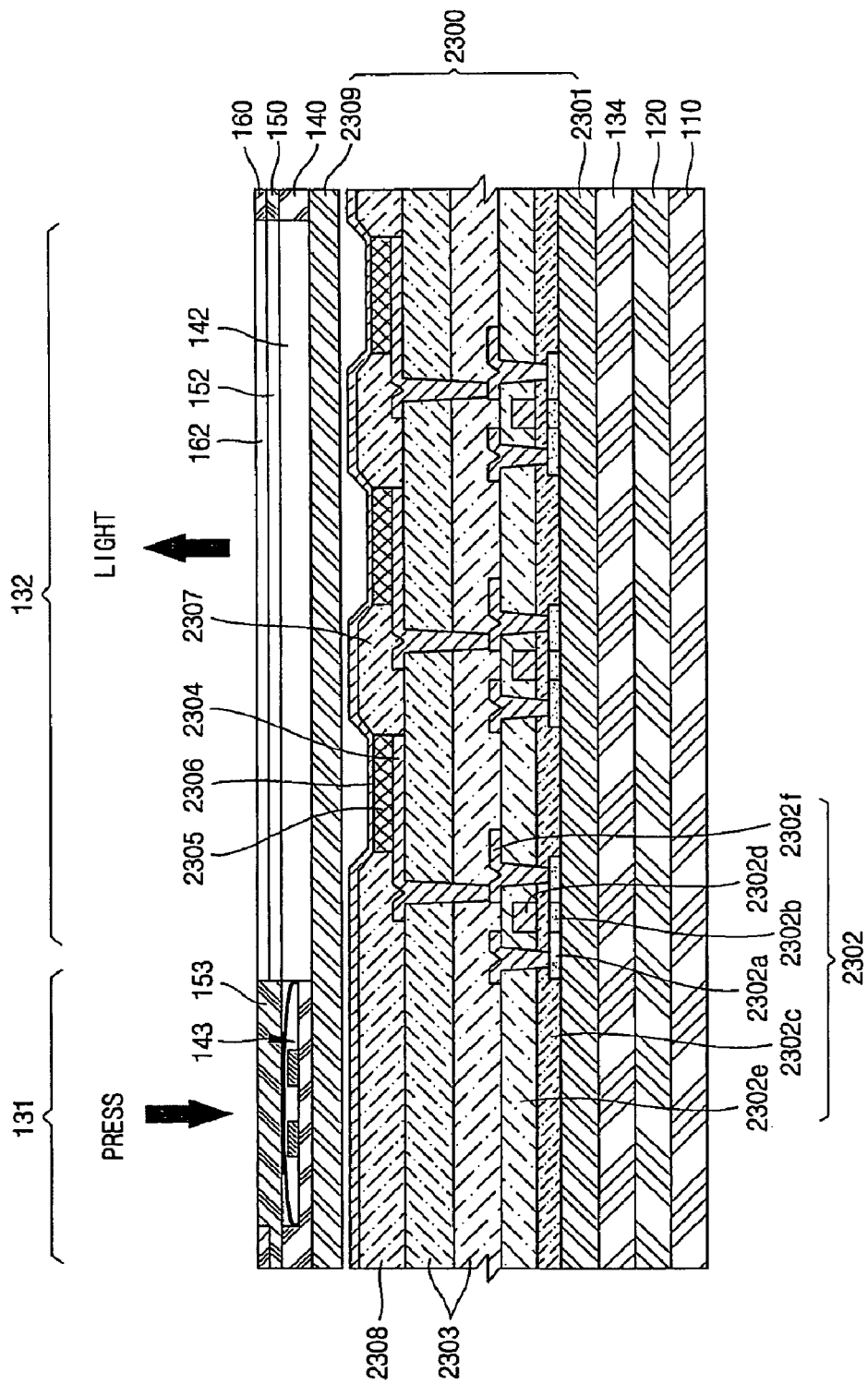
FIG. 10 is a sectional view illustrating another example of the display of a multifunction key pad display, according to aspects of the present invention.

FIG. 10 is a sectional view illustrating another example of the multifunction key pad display, according to aspects of the present invention. The size, thickness, and numbers of the components may vary. A display panel 2300, illustrated in FIG. 10, is an active matrix organic light emitting display. However, according to aspects of the present invention, other types of display panels can be implemented.

As illustrated in FIG. 10, the display panel 2300 includes a first substrate 2301, transistors 2302 formed on the first substrate 2301, insulation layers 2303 formed on the transistors 2302, first electrodes 2304 electrically connected to the transistors 2302, light emitting layers 2305 formed on the first electrodes 2304, second electrodes 2306 formed on the light emitting layers 2305, first pixel defining layers 2307 that define the pixels, and second pixel defining layers 2308 formed on the external circumferences of the first pixel defining layers 2307. The first electrodes 2304, the light emitting layers 2305, the second electrode 2306, and the pixel defining layers 2307 are formed in the display regions 132. The light emitting layers 2305 are not formed in the non-display regions 131.

The first substrate 2301 can be formed of a glass, a plastic resin, a nano compound, a metal, or an equivalent thereof.

However, the material of the first substrate 2301 is not limited to the above. The transistors 2302 can be a silicon oxide layer, a silicon nitride layer, or a silicon oxynitride layer, formed on the first substrate 2301. The transistors 2302 can be thin film transistors (TFT), and can include source/drain regions 2302a and channel regions 2302b. Gate insulation layers 2302c are formed on the surfaces of the transistors 2302, and gate electrodes 2302d can be formed in the regions corresponding to the channel regions 2302b.

Dielectric layers 2302e are formed to cover the gate electrodes 2302d. Source/drain electrodes 2302f, which are electrically connected to the source/drain regions 2302a, are formed on the dielectric layers 2302e. The transistors 2302 can have any known TFT structure, such as, an inverted coplanar structure, a staggered structure, an inverted staggered structure, and an equivalent thereof. However, according to the present invention, the structure of the transistors 2302 is not so limited.

The insulation layers 2303 can be formed on the surfaces of the transistors 2302. The insulation layers 2303 prevent moisture from penetrating the transistors 2302. The insulation layers 2303 can be an organic layer, an inorganic layer, an equivalent thereof, or a mixture thereof. However, the material of the insulation layers 2303 is not limited to the above. The first electrodes 2304 can be formed on the insulation layers 2303, and can be electrically connected to the source/drain electrodes 2302f. The first electrodes 2304 can be formed of ITO, ITO/Ag, ITO/Ag/ITO, ITO/Ag/IZO, or an equivalent thereof. However, the material of the first electrodes 2304 is not limited to the above. Since the first electrodes 2304 were described in detail, a description thereof is omitted.

The light emitting layers 2305 can be formed on the first electrodes 2304. The light emitting layers 2305 can include a hole transport layer (HTL), an emitting layer (EML), and an electron transport layer (ETL). Since the light emitting layers 2305 were described in detail, a description thereof is omitted.

The second electrodes 2306 can be formed on the light emitting layers 2305. The second electrodes 2306 can be formed of Al, LiF, an MgAg alloy, an MgCa alloy, or an equivalent thereof. However, the material of the second electrodes 2306 is not limited to the above. Since the second electrodes 2306 were described above, a description thereof is omitted.

The first pixel defining layers 2307 are formed between the light emitting layers 2305, to physically isolate the light emitting layers 2305. The thickness of the first pixel defining layers 2307 is larger than the thickness of the light emitting layers 2305, to physically isolate the light emitting layers 2305. The first pixel defining layers 2307 can be trapezoidal, so that the upper side of the first pixel defining layers 2307 is larger than the lower side thereof. However, the shape of the first pixel defining layers 2307 is not so limited. The first pixel defining layers 2307 can be formed by exposing and developing a polyimide. However, the present invention is not limited to such a material and/or manufacturing method.

The second pixel defining layers 2308 can be formed on the edges of the light emitting layers 2305 that form the display regions 132. The second pixel defining layers 2308 can be wider than the first pixel defining layers 2307. The non-display regions 131 are defined by the second pixel defining layers 2308. That is, the first electrodes 2304, the light emitting layers 2305, and the first pixel defining layers 2307 are formed in the display regions 132, and the second pixel defining layers 2308 are formed in the non-display regions 131. The second electrodes 2306 can be formed on the first pixel defining layers 2307 and the second pixel defining layers 2308. However, the present invention is not limited to the above structure.

A transparent second substrate 2309 can be formed on the first pixel defining layers 2307 and the second pixel defining layers 2308. The second substrate 2309 may be connected to the first pixel defining layers 2307 and the second pixel defining layers 2308. The second substrate 2309 prevents external moisture and/or dust from reaching the light emitting layers 2305.

The printed circuit board 140, having the openings 142 and the keys 143, is positioned on the second substrate 2309. The pad 150, having the transparent windows 152 and the pressing units 153, is positioned on the printed circuit board 140. The cover 160 is positioned on the pad 150. Such structure is the same as the above-described structure. Therefore, a description thereof is omitted.

The display panel 2300 is divided into non-display regions 131 and display regions 132. The keys 143 formed on the printed circuit board 140 can be positioned in the regions corresponding to the non-display regions 131. The keys 143 can be formed in regions corresponding to the second pixel defining layers 2308. The second pixel defining layers 2308 are thicker than the light emitting layers 2305, and are wider than the first pixel defining layers 2307. When a user presses the pressing units 153, so that the keys 143 are pressed, the second substrate 2309 and the second pixel defining layers 2308 absorb the pressure, to buffer and support the display regions 132. Therefore, the display regions are not damaged when the keys are excessively pressed by the user.

A bezel 134 is positioned under the first substrate 2301. A main printed circuit board 120 is positioned under the bezel 134. A case 110 is positioned under the main printed circuit board 120.

Figure 11:
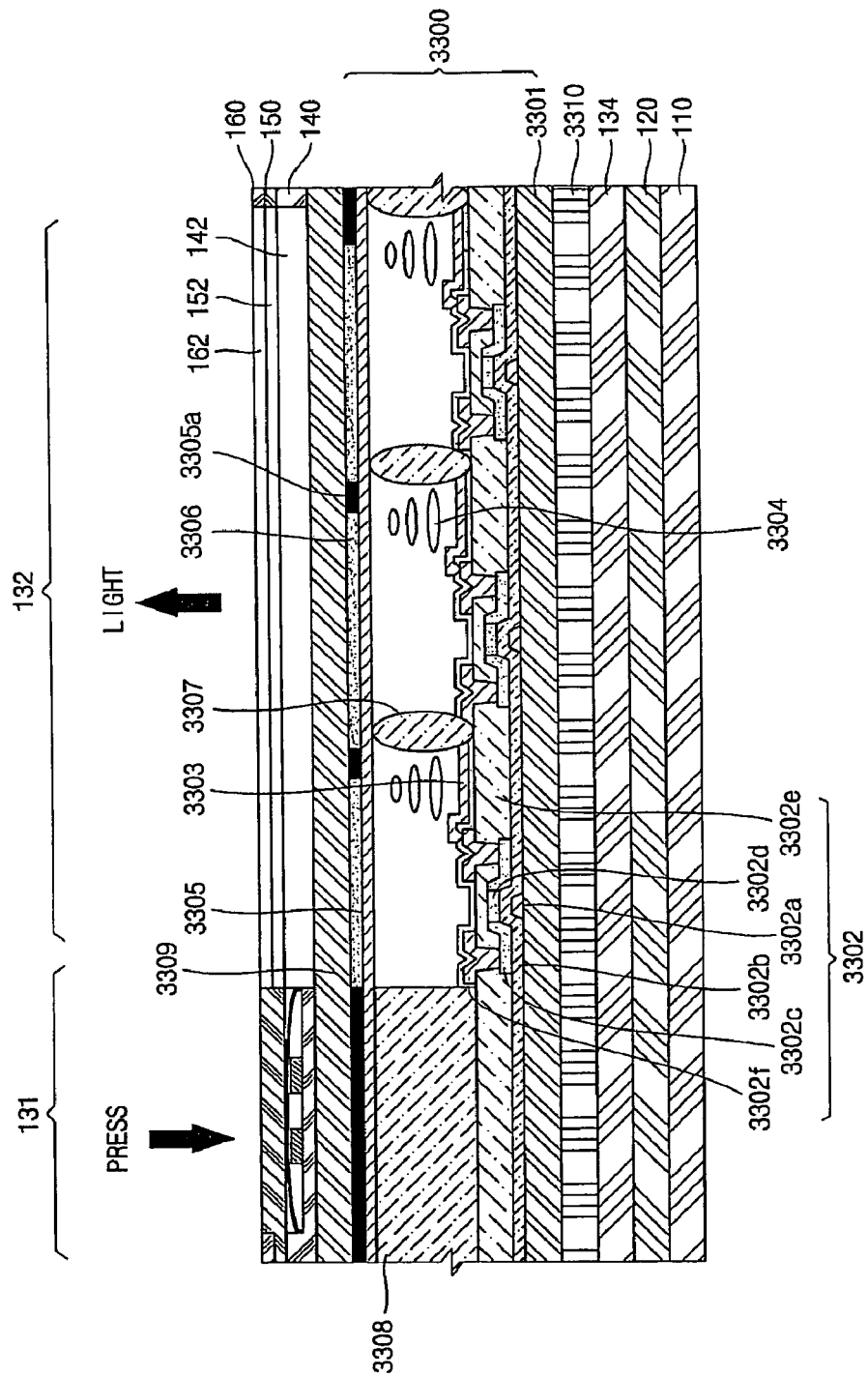
FIG. 11 is a sectional view illustrating another example of a display of a multifunction key pad display, according to aspects of the present invention.

FIG. 11 is a sectional view illustrating another example of a multifunction key pad display, according to aspects of the present invention. The size, thickness, and length of the multifunction key pad display may vary. A display panel 3300, illustrated in FIG. 11, is a liquid crystal display (LCD). However, other types of display panels can be implemented.

As illustrated in FIG. 11, the display panel 3300 includes a first substrate 3301, transistors 3302 formed on the first substrate 3301, first electrodes 3303 electrically connected to the transistors 3302, liquid crystals 3304 formed on the first electrodes 3303, second electrodes 33305 formed on the liquid crystals 3304, color filters 3306 positioned on the second electrodes 3305, first spacers 3307 that define the pixels, and second spacers 3308 formed on the edges of the first spacers 3307. The regions where the transistors 3302, the first electrodes 3303, the liquid crystals 3304, the second electrode 3305, the color filters 3306, and the first spacers 3307 are formed can be defined as the display regions 132. The second spacers 3308 can be formed in the non-display regions 131.

The first substrate 3301 can be formed of a glass, a plastic resin, a nano compound, a metal, or an equivalent thereof. However, the material of the first substrate 3301 is not limited to the above. The transistors 3302 can be a silicon oxide layer, a silicon nitride layer, or a silicon oxynitride layer, formed on the first substrate 3301. Gate electrodes 3302a are formed on the surface of the first substrate 3301, and gate insulation layers 3302b are formed on the surfaces of the gate electrodes 3302a. Source/drain regions 3302c and channel regions 3302d can be formed on the gate insulation layers 3302. Insulation layers 3302e can be formed on the surfaces of the source/drain regions 3302c and the channel regions 3302d. Source/drain electrodes 3302f can be electrically connected to the source/drain regions 3302c. The transistors 3302 can be TFTs. The structures of the transistors 3302 are not so limited.

The first electrodes 3303 can be electrically connected to the source/drain electrodes 3302f. The first electrodes 3303 can be formed of ITO, ITO/Ag, ITO/Ag/ITO, ITO/Ag/IZO, or an equivalent thereof. However, the material of the first electrodes 3303 is not limited to the above. Since the first electrodes 3303 were described in detail, description thereof is omitted.

The liquid crystals 3304 can be formed on the first electrodes 3303. The crystal direction of the liquid crystals 3304 varies with the intensity of an electric field formed between the first electrodes 3303 and the second electrodes 3305, such that light transmittance from a back light 3310 varies.

The second electrodes 3305 can be formed in upper regions that face the first electrodes 3303. The second electrodes 3305 are commonly connected to all of the pixels. The second electrodes 3305 are formed of ITO, ITO/Ag, ITO/Ag/ITO, ITO/Ag/IZO, or an equivalent thereof. However, the material of the second electrodes 3305 is not limited to the above. Since the second electrodes 3305 were described in detail, a description thereof is omitted.

The color filters 3306 can be formed on the second electrodes 3305. The color filters 3306 selectively transmit red, green, or blue light components to the outside, from the back light 3310. Black matrices 3305a can be formed in the color filters 3306, so that the red, green, and blue color filters 3306 can be distinguished from each other.

The first spacers 3307 are positioned between the first substrate 3301 and the second substrate 3309, to separate the first substrate 3301 and the second substrate 3309, from each other. The second spacers 3308 may be formed outside of first spacers 3307. The second spacers 3308 may be wider than the first spacers 3307. In other words, the first spacers 3307 form the display regions 132, and the second spacers 3308 form the non-display regions 131.

A second transparent substrate 3309 may be formed on the first spacers 3307 and the second spacers 3308. The second substrate 3309 may substantially contact the first spacers 3307 and the second spacers 3308. The second substrate 3309 prevents external humidity and/or dust from reaching the liquid crystals 3304.

A printed circuit board 140, having the openings 142 and the keys 143, is positioned on the second substrate 3309. The pad 150, having the transparent windows 152 and the pressing units 153, is positioned on the printed circuit board 140. The cover 160 is installed on the pad 150.

The display panel 3300 is divided into non-display regions 131 and display regions 132. Keys 143 are disposed at positions corresponding to the non-display regions 131. The keys 143 may be formed on the second spacers 3308. The second spacers 3308 are wider than the first spacers 3307. Therefore, when a user presses the pressing units 153, so that the keys 143 are pressed, the second substrate 3309 and the second spacers 3308 absorb, buffer, and support the pressure. Therefore, even when the user excessively presses the keys 143, the display regions 132 are not damaged.

The backlight 3310 is positioned below the first substrate 3301. A bezel 134 and a case 110 are positioned below the main printed circuit board 120.

Figure 12A:
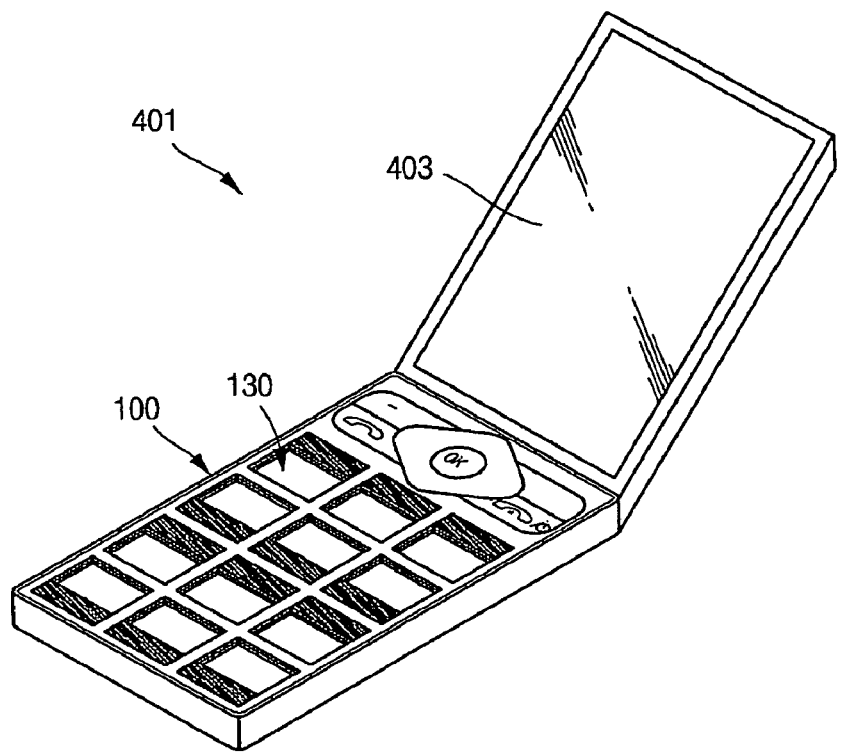
FIGS. 12A and 12B are schematic perspective views illustrating examples of an electronic device having a multifunction key pad display, according to aspects of the present invention.
Figure 12B:
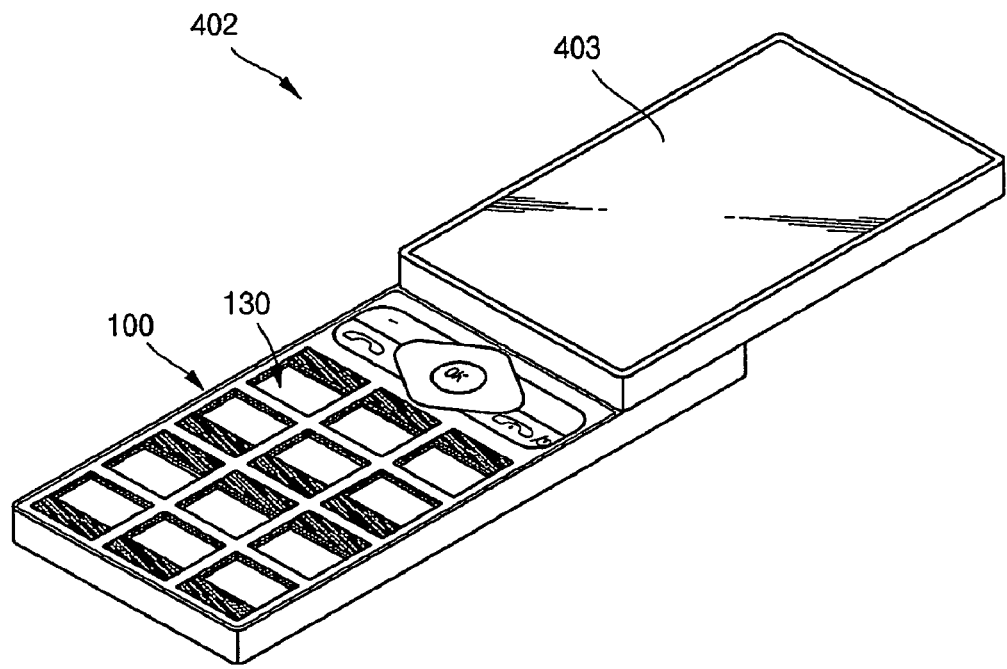

FIGS. 12A and 12B, illustrate examples of electronic devices 401 and 402 having multifunction key pad displays 400. While not illustrated in FIGS. 12A and 12B, the electronic devices 401 and 402 may also include the multifunction key pad displays 100, 200, or 300. In more detail, as illustrated in FIG. 12A, the electronic device 401 may be a flip-type mobile phone. The electronic device 401 includes a main display panel 403 and a display panel 130. As illustrated in FIG. 12 B, the electronic device 402 may be a slide-type mobile phone. The electronic device 402 includes a main display panel 403 and a display panel 130.

A multifunction key pad display, as taught herein, may be applied to various devices, such as, an MP3 player, a car audio device, an auto-console, a PDA, and other industrial displays. However, the type of electronic device is not so limited. As described above, a multifunction key pad display, according to aspects of the present invention, and an electronic device having the same, can conveniently and rapidly perform various input operations, and can display various information. The multifunction key pad display can display text, numbers, special symbols, still images, and moving pictures, according to a selection of a user. The multifunction key pad display can have a low power consumption, and can be manufactured at a low cost.

Although a few embodiments of the present invention have been shown and described, it would be appreciated by those skilled in the art that changes might be made in these embodiments, without departing from the principles and spirit of the invention, the scope of which is defined in the claims and their equivalents.

What is claimed is:

1. A multifunction key pad display comprising:
   a display panel comprising:
      a matrix of display regions aligned in columns and rows, and
      non-display regions to divide the display regions;
   a printed circuit board disposed on the display panel, comprising:
      openings facing the display regions, and
      keys facing the non-display regions, disposed adjacent to sides of the openings; and
   a pad disposed on the printed circuit board, comprising:
      transparent windows facing the openings, and
      pressing units facing the keys,
   wherein:
      the keys are arranged in rows,
      the openings are arranged in rows,
      first and second rows of the keys are adjacent to each other, between at least two adjacent rows of the openings, there being no rows of the openings between the first and second rows of the keys, and
      the first and second rows of keys extend along a first direction, the first and second rows of keys being directly adjacent to each other along a second direction perpendicular to the first direction the two adjacent rows of openings being adjacent to each other along the second direction, and both the first and second row of keys being between the two adjacent rows of openings.

2. The multifunction key pad display as claimed in claim 1, wherein adjacent keys in different ones of the first and second rows are aligned in columns.

3. The multifunction key pad display as claimed in claim 1, wherein adjacent keys in different ones of the first and second rows are diagonally offset in a column direction.

4. The multifunction key pad display as claimed in claim 1, wherein third and fourth rows of the keys in the printed circuit board are disposed outside of the rows of the openings in the printed circuit board, the first and second rows of the keys and at least two rows of the openings being between the third and fourth rows of the keys.

5. The multifunction key pad display as claimed in claim 4, wherein corresponding keys of the third and fourth rows are disposed in columns.

6. The multifunction key pad display as claimed in claim 5, wherein corresponding keys of the third and fourth rows are diagonally offset in a column direction.

7. The multifunction key pad display as claimed in claim 4, wherein the keys of the third and fourth rows which are formed outside of the openings of the two rows have the same column direction.

8. The multifunction key pad display as claimed in claim 1, wherein one of the keys is disposed adjacent to each of the openings.

9. The multifunction key pad display as claimed in claim 1, wherein the keys of the first and second rows partially overlap each other in a column direction.

10. The multifunction key pad display as claimed in claim 1, wherein the pressing units have the same size.

11. The multifunction key pad display as claimed in claim 1, wherein the pressing units have different sizes.

12. The multifunction key pad display as claimed in claim 1, wherein the pressing units have the same column length as a column length of the openings of the printed circuit board.

13. The multifunction key pad display as claimed in claim 1, wherein the pressing units have a column length that is smaller than a column length of the openings.

14. The multifunction key pad display as claimed in claim 1, wherein the keys comprise dome switches.

15. The multifunction key pad display as claimed in claim 1, wherein the keys comprise:
conductive patterns; and
elastic members to selectively contact the conductive patterns.

16. The multifunction key pad display as claimed in claim 1, wherein the display panel comprises pixels only in the display regions among the display regions and the non-display regions.

17. The multifunction key pad display as claimed in claim 16, wherein the display panel is one selected from the group consisting of a passive matrix organic light emitting display, an active matrix organic light emitting display panel, and a liquid crystal display panel.

18. The multifunction key pad display as claimed in claim 1, wherein the display panel comprises:
a data driver electrically connected to the display regions; and
a scan driver electrically connected to the display regions.

19. The multifunction key pad display as claimed in claim 1, wherein the pad comprises:
an insulation layer;
a metal layer formed on the insulation layer; and
pressing units disposed to face the keys.

20. The multifunction key pad display as claimed in claim 1, wherein the pressing units protrude from the pad.

21. An electronic device comprising the multifunction key pad display as claimed in claim 1.

22. The electronic device as claimed in claim 21, further comprising a main display panel electrically and mechanically connected to the multifunction key pad display.

23. The electronic device as claimed in claim 1, wherein:
there are no rows of the openings in an entire region extending between the adjacent first and second rows of keys, the entire region extending along a first direction and a second direction perpendicular to the first direction, and
two openings in respective two adjacent rows of openings are separated from each other in the second direction by two keys directly adjacent to each other, the second direction being perpendicular to a direction of the first and second rows of keys.

* * * * *